(12) United States Patent
Arbanas et al.

(10) Patent No.: US 6,278,603 B1
(45) Date of Patent: Aug. 21, 2001

(54) LOW INDUCTANCE CAPACITOR

(75) Inventors: Zelijko Arbanas, Springfield; Richard J. Galante, Wakefield, both of MA (US)

(73) Assignee: Acumentrics Corporation, Westwood, MA (US)

( * ) Notice: Subject to any disclaimer, the term of this patent is extended or adjusted under 35 U.S.C. 154(b) by 0 days.

(21) Appl. No.: 09/519,796

(22) Filed: Mar. 7, 2000

Related U.S. Application Data

(60) Provisional application No. 60/123,340, filed on Mar. 8, 1999.

(51) Int. Cl.[7] .............................. H01G 4/228; H01G 4/32
(52) U.S. Cl. .................................... 361/306.1; 361/301.5; 361/517; 361/535
(58) Field of Search ............................. 361/306.1–306.3, 361/307, 308.1–308.3, 309, 310, 301.5, 273, 516, 517, 511, 535, 530

(56) References Cited

U.S. PATENT DOCUMENTS

| | | | |
|---|---|---|---|
| 1,830,907 | * 11/1931 | Kindl | 361/307 |
| 3,024,393 | * 3/1962 | Ferrante | 361/306.1 |
| 5,493,471 | * 2/1996 | Walther et al. | 361/328 |

* cited by examiner

Primary Examiner—Dean A. Reichard
Assistant Examiner—Eric Thomas
(74) Attorney, Agent, or Firm—Weingarten, Schurgin, Gagnebin & Hayes LLP

(57) ABSTRACT

A capacitor includes a capacitor body containing capacitive conductive plates. The capacitor body has a first end and a second opposing end, such as the opposite ends of a cylindrical body. A conductive shell is disposed around the capacitor body. The conductive shell has a first end conductively connected to a first one of the conductive plates at the first end of the capacitor body. The conductive shell also has flexible conductive members disposed at a second end adjacent to the second end of the capacitor body. The flexible conductive members extend away from the capacitor body so as to be brought into conductive contact with a conductive surface against which the capacitor is to be mounted in use, such as an upper layer of a multi-layer bus. One capacitor mounting arrangement uses the above capacitor with a multi-layer DC bus structure. In another mounting arrangement, a resilient conductive gasket is disposed between the hard edge of a capacitor shell and a surface of a bus structure. In yet another mounting arrangement, flexible conductive members are formed in the conductive surface to resiliently engage the hard edge of a capacitor shell.

22 Claims, 5 Drawing Sheets

LOW INDUCTANCE CAPACITOR

CROSS REFERENCE TO RELATED APPLICATIONS

This application claims priority under 35 U.S.C. §119(e) of U.S. Provisional Patent Application No. 60/123,340, filed Mar. 8, 1999.

STATEMENT REGARDING FEDERALLY SPONSORED RESEARCH OR DEVELOPMENT

Not Applicable

BACKGROUND OF THE INVENTION

The invention is related to the field of capacitors used in uninterruptible power supplies and similar power systems.

Large capacitors are used in power supplies to provide desired filtering and hold-up of DC bus voltages under transient conditions. It is common to employ a "bank" of several such capacitors connected in parallel in order to achieve a large aggregate capacitance value. The parallel connections among the capacitors are often achieved using conductive "buses" having large current-carrying capacities. For example, two closely-spaced buses may run along a capacitor bank, one bus carrying a ground connection, for example, and the other carrying an output DC voltage connection, such as for example 800 volts DC. The parallel connection is achieved by connecting one bus to one terminal of each capacitor, and the other bus to the other terminal of each capacitor. In one common arrangement the buses are separate layers of a multi-layer planar bus structure.

When multiple cylindrical capacitors are used in a capacitor bank, it is desirable that they be placed in an upright position with respect to the bus structure in order to maximize packaging density, i.e., to realize the greatest amount of capacitance in a given space. However, the capacitors typically have their two terminals located at different ends of the capacitor body. The upper capacitor terminal must be connected to the respective bus in the multi-layer structure located at the other end of the capacitor. In prior systems, this connection has been made using a low-gauge wire running alongside the capacitor body from the upper terminal to the respective bus. Unfortunately, such a wire introduces additional inductance in the electrical path between the capacitor and the buses, increasing the amplitude of voltage spikes experienced by switching devices connected to the buses. It would be desirable to significantly reduce such inductance without sacrificing the spatial density achieved with the upright mounting of capacitors in a capacitor bank.

BRIEF SUMMARY OF THE INVENTION

In accordance with the present invention, a capacitor and capacitor mounting arrangement are disclosed in which the inductance of the connection between a connection bus and an upper terminal of an upright capacitor is significantly reduced from prior approaches. The packaging density associated with upright capacitor mounting is retained, while the stray inductance in the capacitor connections is reduced.

The disclosed capacitor includes a capacitor body containing the capacitive conductive plates. The capacitor body has a first end and a second opposing end. A conductive shell is disposed around the capacitor body. The conductive shell has a first end conductively connected to a first one of the conductive plates at the first end of the capacitor body. The conductive shell also has flexible conductive members disposed at a second end of the shell adjacent to the second end of the capacitor body. The flexible conductive members extend away from the capacitor body so as to be brought into conductive contact with a conductive surface against which the capacitor is to be mounted in use, such as an upper layer of a multi-layer bus.

Because of the large surface area of the conductive shell and the manner in which the shell contacts the conductive surface, the inductance between the conductive surface and the first plate of the capacitor and the second plate of the capacitor can be substantially less than in prior capacitor mounting arrangements. When the capacitor is used to filter the output of a power supply, this reduced inductance results in reducing the amplitude of voltage spikes experienced by switching devices connected to the output.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

The disclosure of U.S. Provisional Patent Application No. 60/123,340, filed Mar. 8, 1999, is hereby incorporated by reference.

Figure 1:
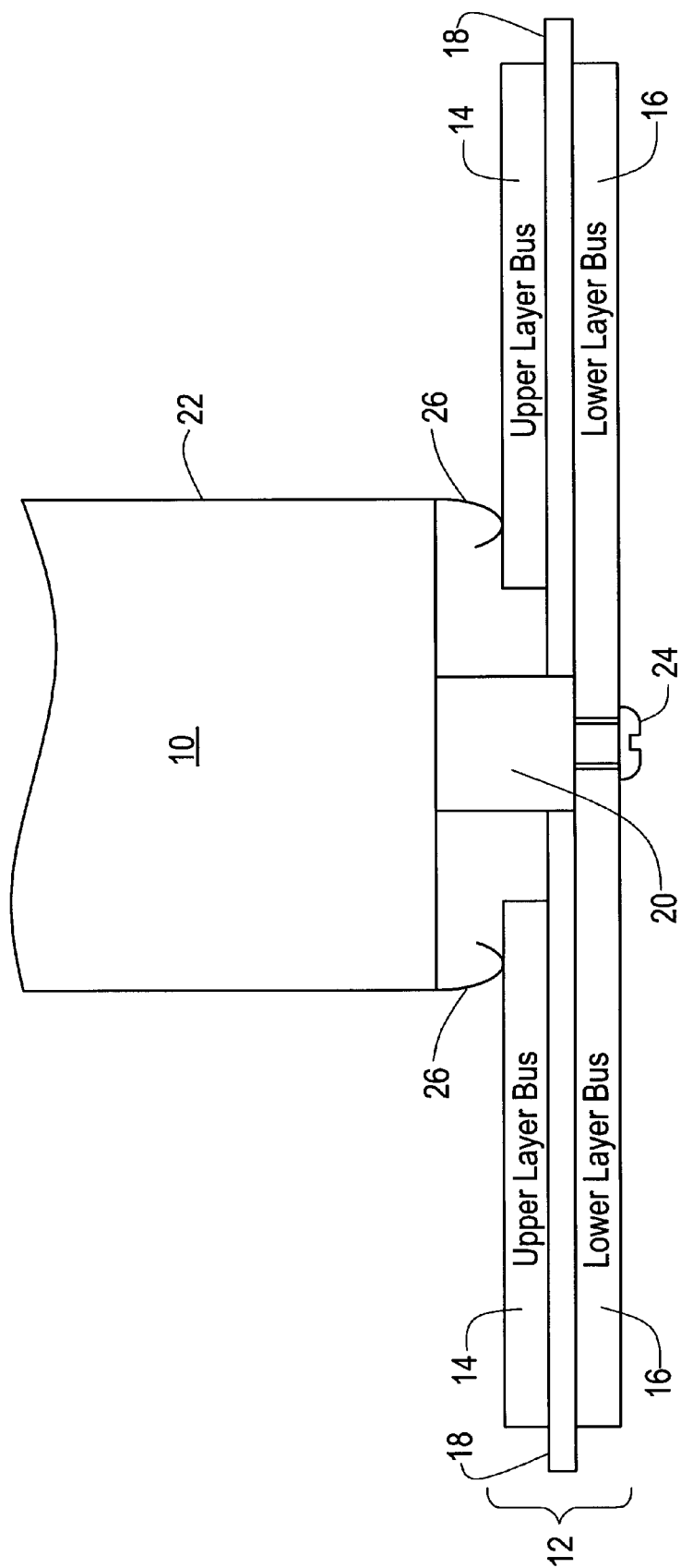
FIG. 1 is an elevation diagram showing a mechanical arrangement of a low-inductance capacitor and a DC bus structure in accordance with the present invention.

Referring to FIG. 1, a cylindrical capacitor 10 is secured to a planar, multi-layer DC bus structure 12 such as are generally used in uninterruptible power supplies or other heavy duty power supplies. The DC bus structure 12 includes a conductive upper layer bus 14 and a conductive lower layer bus 16 separated by an insulating layer 18. It is to be understood that during operation, an operating voltage normally appears between the upper layer bus 14 and the lower layer bus 16. The 2-terminal capacitor 10 is connected between the buses 14 and 16 to assist in maintaining a steady operating voltage.

In particular, the capacitor 10 has two separate contacts for connecting its internal plates (not shown in FIG. 1) to an external circuit, such as the DC bus structure 12. One of these contacts is a conductive post 20 extending away from the body 22 of the capacitor. The post 20 is connected to one plate of the capacitor 10 in a manner described below. The post 20 extends through an opening in the upper layer bus 14 and contacts the lower layer bus 16, to which the post 20 is secured by a bolt 24. The other contact of the capacitor 10 consists of a set of resilient conductive fingers 26 that are urged against the upper layer bus 14 when the capacitor 10 is in the illustrated installed position. The arrangement of the fingers 26 and the manner in which they are connected to the other plate of the capacitor are described below.

Figure 2:
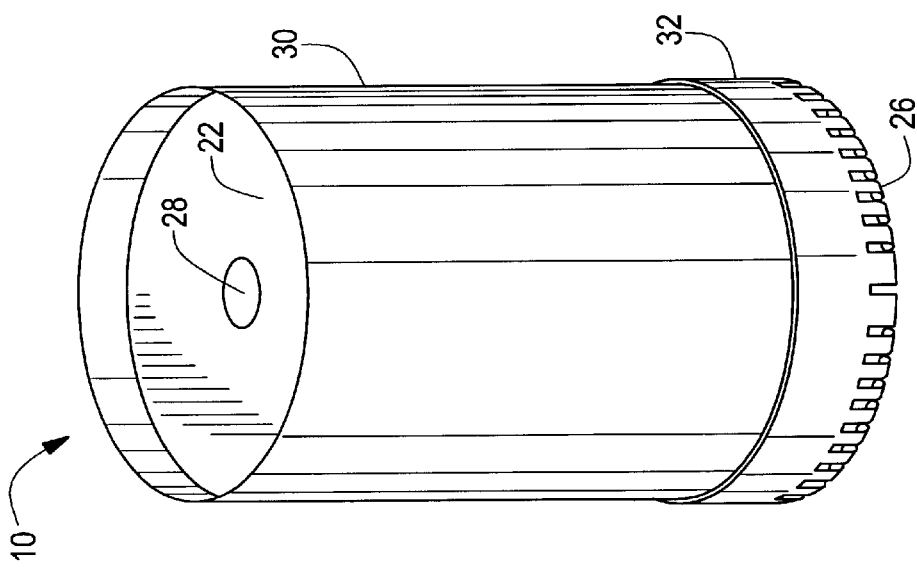
FIG. 2 is a perspective diagram of the capacitor of FIG. 1.

FIG. 2 shows the capacitor 10 without its insulating outer wrapper. Also, for the sake of description some components at the upper end of the capacitor 10 have been omitted from FIG. 2. The capacitor body 22 consists of a set of conducting and insulating layers that have been rolled into the illustrated cylindrical form about a central opening 28. Surrounding the capacitor body 22 is a conductive sleeve 30 used as part of the connection between one plate of the capacitor 10 and the upper layer bus 14 of FIG. 1. The upper end of the sleeve 30 is connected to the respective capacitor plate in a manner described below. A contact strip 32, on which the resilient fingers 26 are formed, is conductively mated with the lower end of the sleeve 30. When the capacitor 10 is in the installed position shown in FIG. 1, the contact strip 32 provides the electrical connection between the sleeve 30 and the upper layer bus 14. The strip 32 can be mated or attached to the sleeve 30 by a variety of techniques, including soldering.

Figure 4:
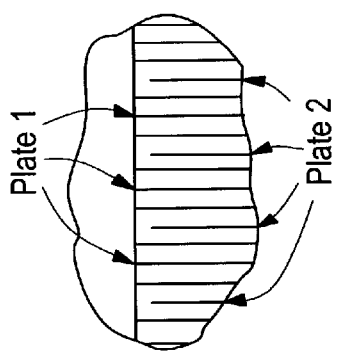
FIGS. 4 and 5 show detailed views of upper and lower portions of the capacitor of FIG. 3.
Figure 5:
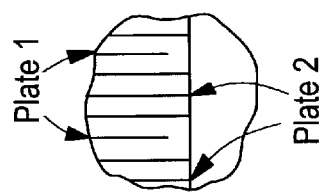
Figure 3:
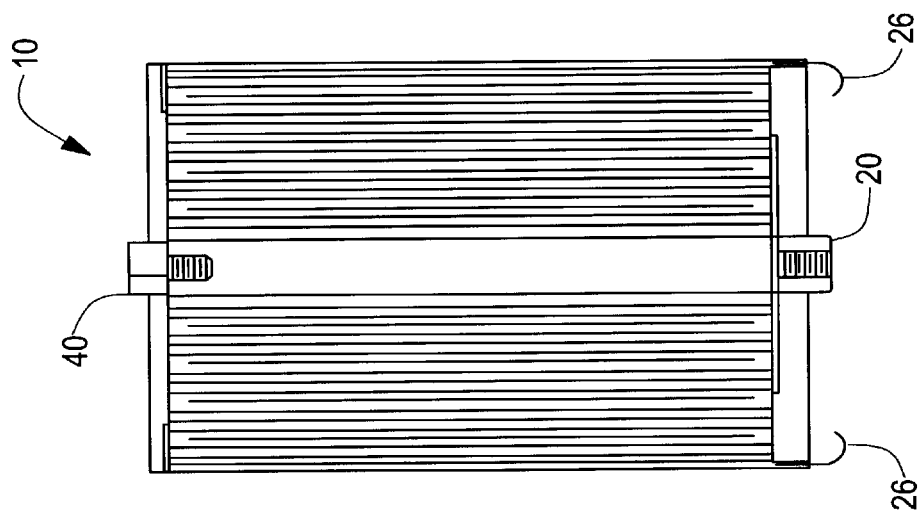
FIG. 3 is a cross-sectional view of the capacitor of FIGS. 1 and 2.

FIG. 3 shows the capacitor 10 in cross section. It will be observed that the two rolled-together plates are offset slightly from each other in the vertical direction in FIG. 1. As a result, each plate has a portion extending beyond the other plate at a corresponding end of the capacitor 10. This feature is shown in detail in FIGS. 4 and 5. Thus, at each end of the capacitor a conductive contact can be formed that contacts only the extended portion, and thus only the respective plate.

Also shown in FIG. 3 is an insulative standoff 40 disposed within the central opening 28 at the upper end of the body 22. This standoff 40 or a similar member can be used to attach the upper end of the capacitor 10 to a retaining bar (not shown) used to provide mechanical stability to a bank of capacitors like the capacitor 10 that are arranged on the DC bus structure 12.

Figure 6:
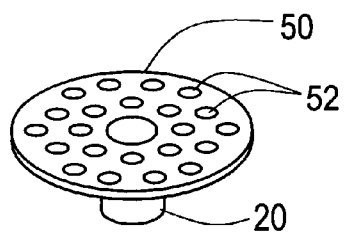
FIG. 6 is a perspective diagram of a conductive disk used to provide one terminal of the capacitor of FIGS. 1–3.

FIG. 6 shows a conductive disk 50 used to provide the contact at the lower end of the capacitor 10. The post 20 ends from the disk 50, and is either formed integrally therewith or is attached thereto via soldering or a similar technique. As shown, the disk 50 has a number of holes 52 formed therein to improve its solderability.

The contacts at the two ends of the capacitor 10 can be formed in the following manner. First, a layer of zinc is applied at each end to provide low-impedance connections to the respective plates. The zinc may be applied via spraying or any other suitable application technique. A layer of tin is then applied over the zinc layer. The tin layer is used to provide a better surface for solder contact than that provided by the zinc layer. Other suitable conductive materials may be substituted for the zinc and tin layers. At the lower end of the capacitor 10, the disk 50 is soldered to the tin layer to form a low impedance connection therebetween. As mentioned above, the post 20 may be mechanically attached to the disk 50 or alternatively can be formed as an integral part of the disk 50. In a preferred embodiment the post 20 is disposed along the longitudinal axis of the capacitor 10. At the upper end of the capacitor 10, it may be sufficient to ensure that the zinc and tin layers make suitable contact with the inner surface of the sleeve 30. Alternatively, it may be desirable to configure the upper end of the sleeve 30 to include extended fingers that can be folded down and soldered to the tin layer. This technique is shown below. Other suitable configurations for achieving a rugged, low-impedance connection between the sleeve 30 and the tin layer can also be used.

Figure 7:
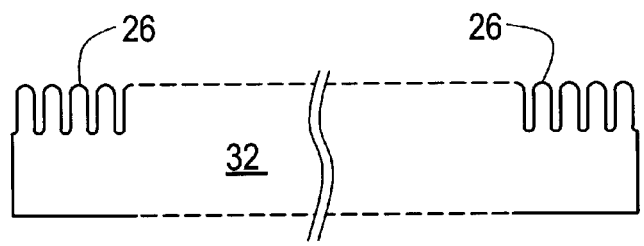
FIG. 7 is a plan diagram of a conductive contact strip used in the capacitor of FIGS. 1–3.

FIG. 7 shows the conductive strip 32 in more detail. The strip 32 is a stamped member made, for example, of a beryllium-copper compound to provide good electrical and mechanical characteristics. The fingers 26 may be plated with gold or silver, if desired, to provide improved conductivity. A typical thickness for the strip 32 is 0.005".

Figure 8:
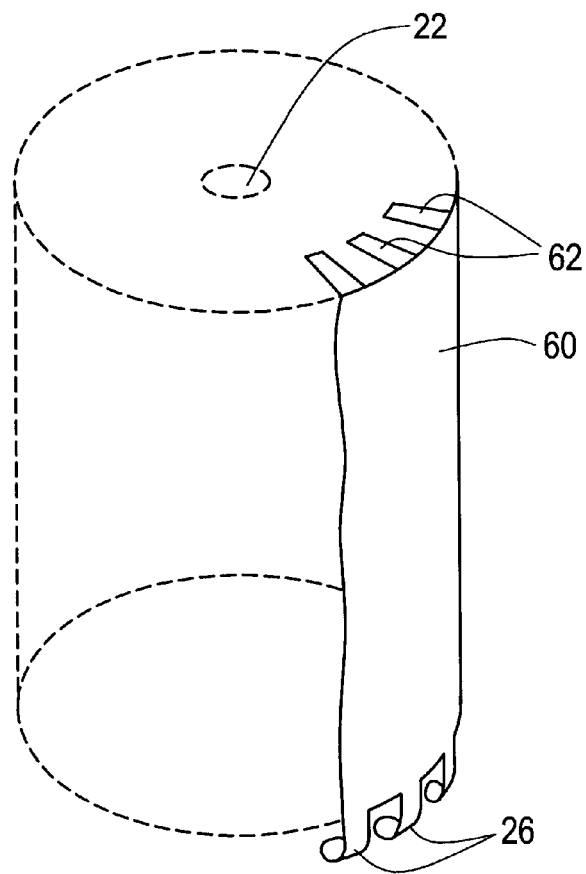
FIG. 8 is a partial perspective view of an integrally formed conductive sleeve that may be used in place of a conductive jacket and contact strip in the capacitor of FIGS. 1–3.

FIG. 8 shows an alternative manner of providing a connection between the upper layer bus 14 and the capacitor plate accessible at the upper end of the capacitor 10. A unitary conductive sleeve 60 has the resilient fingers 26 formed integrally therewith. At the top end, tab members 62 are folded over the edge of the capacitor body 22 and soldered to the above-described tin layer (not shown). While the sleeve 60 is a more customized piece requiring special tooling for manufacture, its additional cost may be offset by savings in the assembly process and improved product characteristics.

An insulative outer wrapper may be disposed around the sleeve 30 (FIG. 2) or the sleeve 60. The length of the wrapper is selected in one embodiment so as to extend beyond the ends of the capacitor body 22 thus forming a cavity at each end. Epoxy is then poured into the cavity to seal the ends and to provide electrical insulation for the tin/zinc layers. The epoxy additionally provides further mechanical support for the post 20 and the standoff 40. The resilient fingers 26 extend beyond the surface of the epoxy.

Figure 9:
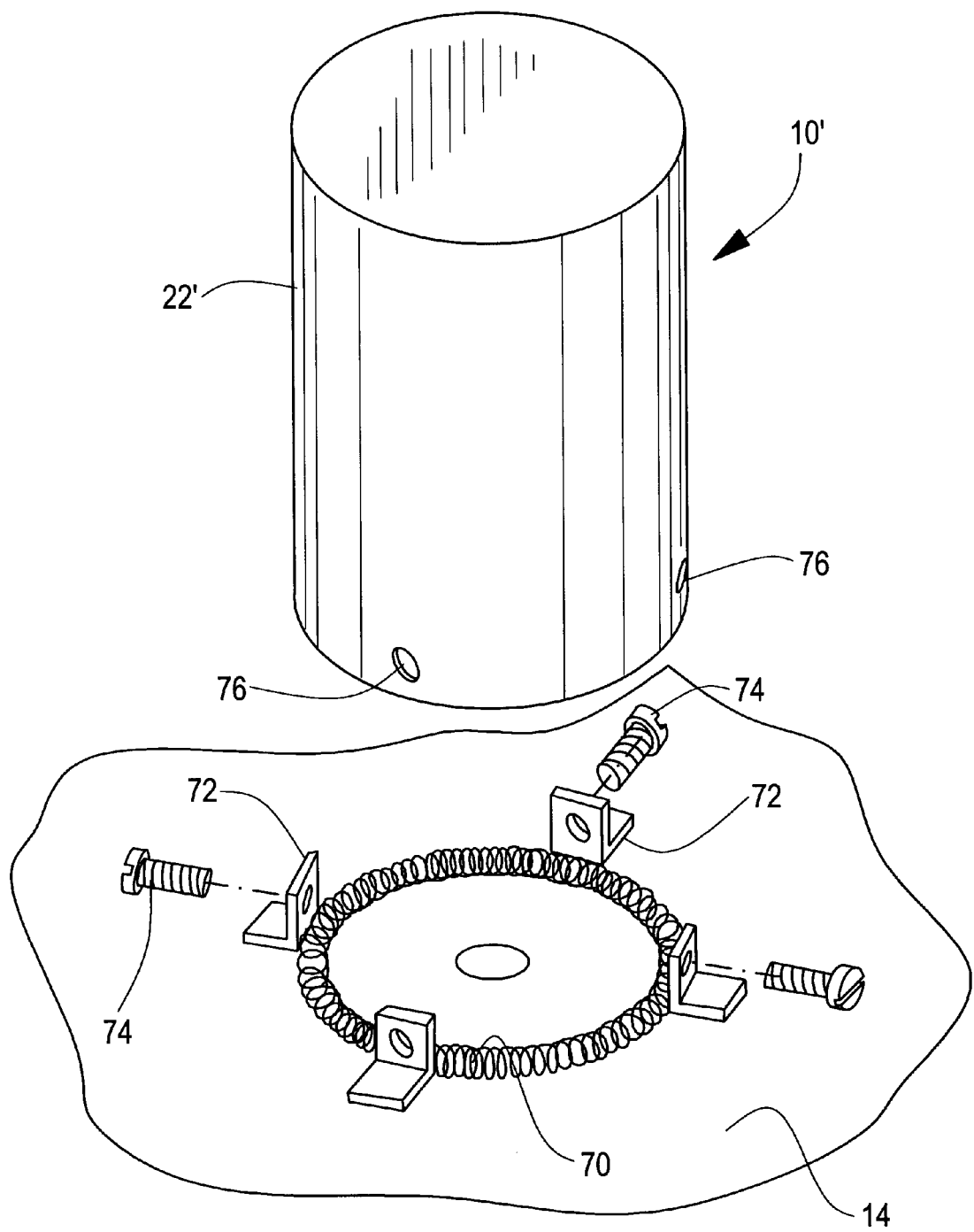
FIG. 9 is a diagram illustrating an alternative arrangement in which a low-inductance capacitor is coupled to a DC bus structure using a resilient conductive ring.

FIG. 9 shows an alternative capacitor mounting arrangement providing benefits similar to those provided by the above-described embodiment. A capacitor 10' is made in a fashion similar to the above capacitor 10, except that at its lower end the conductive shell 22' terminates at a hard edge rather than at a set of resilient fingers. An annular, resilient conductive gasket 70 is placed between the capacitor 10' and the upper layer bus 14. The gasket 70 may be of the type, for example, having an elastomeric body impregnated with small pieces of conductive material. A set of brackets 72 or other suitable holders are attached to the bus structure 12 adjacent to the capacitor mounting location. The capacitor 10' is held in place by screws 74 extending through the brackets 72 and corresponding holes 76 in the sleeve 22'. When the capacitor 10' is so held in place, the hard lower edge of the sleeve 22' is urged into resilient conductive contact with the gasket 70.

Figure 10:
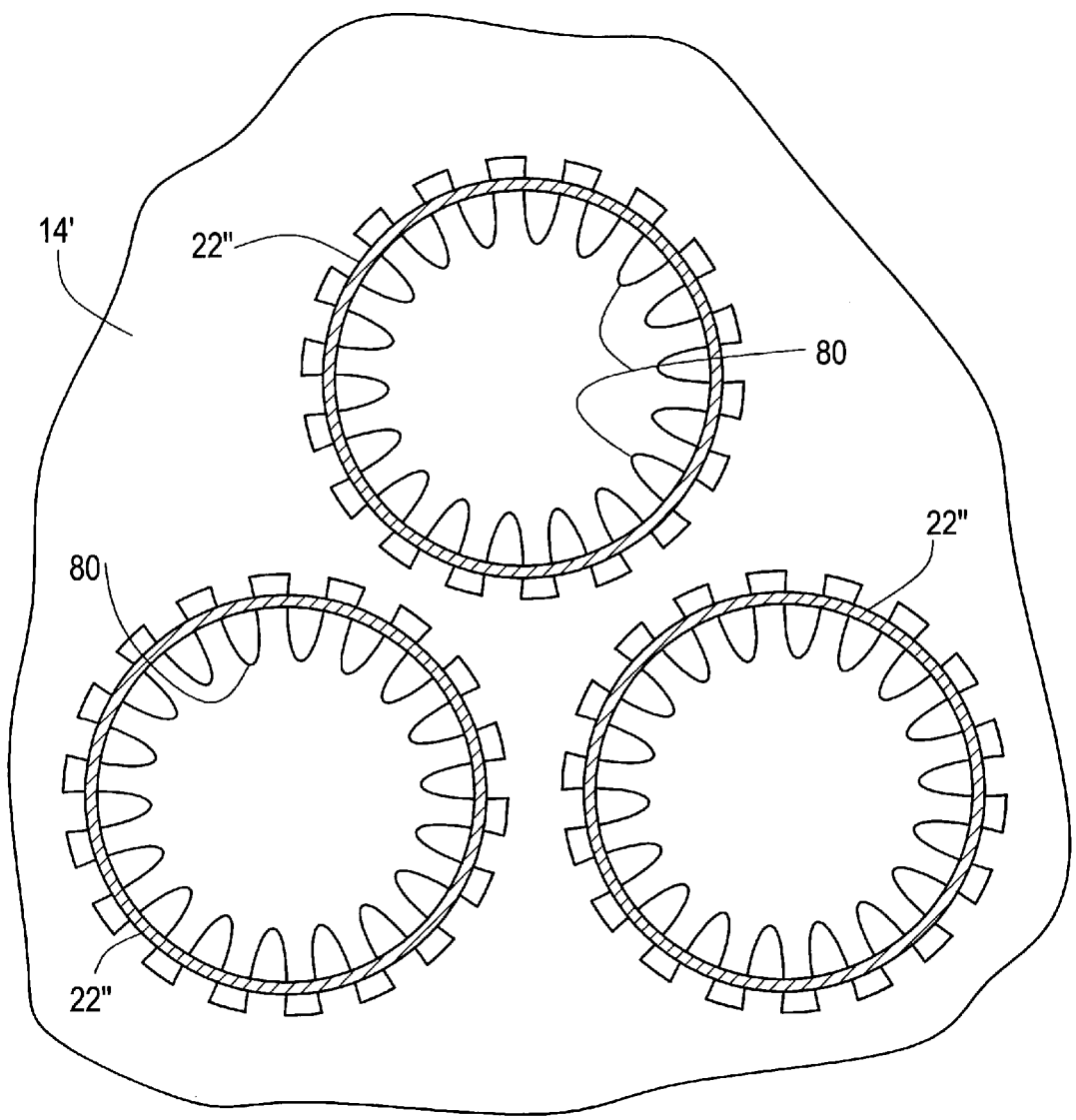
FIG. 10 is plan view illustrating an alternative technique for coupling a DC bus structure to a low-inductance capacitor using resilient fingers integrally formed with an upper layer of the DC bus structure.

FIG. 10 shows yet another arrangement having characteristics similar to those of the above-described embodiments. In this arrangement, resilient fingers 80 are formed integrally with the upper layer bus 14'.

In the embodiments of FIGS. 9 and 10, the sleeve 22' or 22" may simply terminate in a hard edge or alternatively can be folded over at the lower end to provide a larger surface area for contacting the conductive gasket 70 or fingers 80.

While a capacitor has been described having resilient conductive fingers and a conductive post at the connection end, it should be appreciated that the resilient finger connection technique may be employed to provide a post connection at a first capacitor end and a resilient-finger connection at the opposing capacitor end. In such event, conductive connection to the resilient fingers is made by mechanically urging a conductive bus or plate against the conductive resilient fingers.

It will further be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A capacitor, comprising:
   a capacitor body having a first end and a second opposing end, the capacitor body including conductive plates; and
   a conductive shell disposed around the capacitor body, the conductive shell having a first end conductively connected to a first one of the conductive plates at the first end of the capacitor body, the conductive shell having flexible conductive members disposed at a second end adjacent to the second end of the capacitor body, the flexible conductive members extending away from the capacitor body so as to abut a conductive surface and conductively couple the first capacitor plate to the conductive surface when the capacitor is mounted in a mounting position.

2. A capacitor according to claim 1, wherein the capacitor body and the shell are cylindrical.

3. A capacitor according to claim 2, wherein the capacitor body and the shell have a circular cross section.

4. A capacitor according to claim 1, wherein the shell is conductively connected to the first capacitor plate by conductive material extending across the first end of the capacitor body.

5. A capacitor according to claim 4, wherein the conductive material comprises an inner layer of zinc and an outer layer of tin.

6. A capacitor according to claim 1, wherein a portion of the first plate extends beyond a second plate at the first end of the capacitor body, the extended portion of the first plate being conductively connected to the shell.

7. A capacitor according to claim 1, further comprising a conductive terminal conductively connected to the second plate at the second end of the capacitor body, the conductive terminal extending away from the capacitor body and being configured for connection to a conductive surface other than the conductive surface against which the capacitor is to be mounted.

8. A capacitor according to claim 7, wherein the conductive shell of the capacitor is at least partially open at the second end of the capacitor body, and wherein the conductive terminal extends beyond the second end of the conductive shell to be connected to the other conductive surface.

9. A capacitor according to claim 8, wherein the terminal is disposed in a central area of the second end of the capacitor.

10. A capacitor according to claim 7, wherein the terminal is disposed in a central area of the second end of the capacitor.

11. A capacitor according to claim 7, wherein the terminal has a threaded hole for receiving a bolt to secure the terminal against the other conductive surface.

12. A capacitor according to claim 7, further comprising a non-conductive standoff member disposed at the first end to engage a support member to be mounted against the first end of the capacitor when in use.

13. A capacitor according to claim 1, wherein the shell includes a covering portion substantially surrounding the capacitor body, and a conductive contact strip conductively attached to the covering portion, the contact strip carrying the flexible conductive members.

14. A capacitor according to claim 1, wherein the flexible conductive members are sheet members having a J-shaped cross section.

15. A capacitor for use with a multi-layer bus structure, comprising:
    a cylindrical capacitor body having first and second conductive plates, a portion of the first plate extending beyond the second plate at a first end of the capacitor body, and a portion of the second plate extending beyond the first plate at a second end of the capacitor body;
    a cylindrical conductive shell disposed around the capacitor body, the conductive shell having a first end conductively attached to the first plate at the first end of the capacitor body, the conductive shell having flexible conductive members at the second end, the flexible conductive members extending away from the capacitor body so as to be brought into conductive contact with a first conductive layer of the multi-layer bus structure when the capacitor is in and installed position thereon; and
    a conductive terminal conductively attached to the extended portion of the second plate at the second end of the capacitor body, the conductive terminal extending away from the capacitor body and being configured for connection to a second conductive layer of the multi-layer bus structure when the capacitor is in the installed position.

16. Electrical apparatus, comprising:
    a circuit structure having a conductive surface;
    a capacitor extending from the conductive surface, the capacitor including a body having a first end away from the conductive surface and a second opposing end near the conductive surface, the capacitor body including first and second conductive plates, the capacitor also including a conductive shell disposed around the capacitor body, the conductive shell having first and second ends, the first end of the conductive shell being conductively connected to a first one of the conductive plates at the first end of the capacitor body; and
    a resilient conductive member disposed between said second end of said capacitor body and said circuit structure and operative to conductively couple the second end of the conductive shell of the capacitor to the conductive surface.

17. Electrical apparatus according to claim 16, wherein the resilient conductive member comprises a plurality of flexible conductive members extending from the second end of the conductive shell of the capacitor.

18. Electrical apparatus according to claim 17, wherein the conductive members are integrally formed with the conductive shell.

19. Electrical apparatus according to claim 17, wherein the resilient conductive member comprises a conductive contact strip conductively mated to the second end of the conductive shell.

20. Electrical apparatus according to claim 16, wherein the resilient conductive member comprises a plurality of flexible conductive members extending from the conductive surface.

21. Electrical apparatus according to claim 20, wherein the flexible conductive members are integrally formed with the conductive surface.

22. Electrical apparatus according to claim 16, wherein the resilient conductive member comprises a resilient conductive gasket disposed between the conductive surface of the circuit structure and the second end of the shell of the capacitor.

* * * * *

UNITED STATES PATENT AND TRADEMARK OFFICE
CERTIFICATE OF CORRECTION

PATENT NO. : 6,278,603 B1  
DATED : August 21, 2001  
INVENTOR(S) : Zeljko Arbanas et al.

It is certified that error appears in the above-identified patent and that said Letters Patent is hereby corrected as shown below:

<u>Title page,</u>
Item [75], Inventors:, "Zelijko" should read -- Zeljko --.

Signed and Sealed this

Fourth Day of June, 2002

Attest:

JAMES E. ROGAN  
Attesting Officer    *Director of the United States Patent and Trademark Office*